United States Patent Office 3,238,146
Patented Mar. 1, 1966

3,238,146
CATALYSTS AND THEIR PREPARATION
William A. Hewett, Oakland, and Edward C. Shokal, Walnut Creek, Calif., assignors to Shell Oil Company, New York, N.Y., a corporation of Delaware
No Drawing. Filed Mar. 21, 1960, Ser. No. 16,124
9 Claims. (Cl. 252—441)

This invention relates to new catalysts and to their preparation. More particularly, the invention relates to a new type of metal-containing catalyst to a method for their preparation and to the use of the new catalyst, particularly for the polymerization of unsaturated monomers.

Specifically, the invention provides new and particularly useful catalysts comprising crystals of a metal salt, and preferably a salt of a metal having atomic weight between 24 and 209, such as, for example, $CoCl_2$, coated on the surface with a molecularly thin layer of a dissimilar metal salt, such as, for example, $TiCl_4$. The invention further provides a new method for preparing these catalysts, such as by use of a vacuum technique and by shaking the two salts together. As a special embodiment, the invention further provides a method for utilizing the new catalysts, particularly for the polymerization of unsaturated monomers.

It is known that certain monomers, such as propylene, can be converted to polymers having an oriented structure by contacting with titanium trichloride in combination with aluminum trialkyl. While this process gives a good yield of desired isotactic polymer, it involves the consumption of a considerable amount of titanium salt. This is undesirable because of cost as well as the fact that this technique gives rise to complications in the cleaning up of the polymer. It would be highly desirable to find a catalyst system that will give stereo-specific polymers without the utilization of such large amounts of the metal catalysts.

It has been found that many of these difficulties can be overcome by using a new catalyst system obtained by coating a metal salt with a thin layer of a metal, and these new catalyst compositions are described and claimed in copending application Serial No. 808,020, filed April 22, 1959, now abandoned. These new catalysts, however, in many cases have a slow reaction rate and the preferred insolubles obtained are not quite as high as would be desired for certain applications.

It is, therefore, an object of the invention to provide new catalysts that can be used to polymerize unsaturated monomers to form oriented polymers. It is a further object to provide new metal containing polymerization catalysts that can be used to polymerize monomers at a relatively fast rate. It is a further object to provide a new class of polymerization catalyst that gives a high percent of insolubles as a resulting product. It is a further object to provide a new class of catalysts than can be used to convert unsaturated monomers into high yields of high molecular weight polymers. It is a further object to provide new catalysts that permit more efficient clean up of the polymers. It is a further object to provide new catalysts and a method for their preparation using vacuum technique. It is a further object to provide new catalysts that are useful for polymerization, isomerization, hydrogenation and the like reactions. Other objectives and advantages of the invention may be apparent from the following detailed description thereof.

It has now been discovered that these and other objects may be accomplished by the new catalysts of the invention comprising small crystals of the metal salt and preferably a salt of a metal having atomic weight between 24 and 209, coated on the surface with a molecularly thin layer of a dissimilar metal salt. It has been found that catalysts of this type have unexpected catalytic activity, particularly in the polymerization of unsaturated monomers. It has been found, for example, that these special catalysts, preferably in combination with metal alkyl co-catalysts, can polymerize unsaturated monomers capable of forming stereospecific polymers, such as propylene, to form high molecular weight polymers which have a high degree of crystallinity. These catalysts are particularly outstanding in this capacity as they produce large quantities of the polymer without consuming very much of the metal catalyst. The use of this new catalyst system, for example, results in the production of from 10 to 40 times more polypropylene per pound of titanium than the conventional titanium trichloride systems. This not only results in savings in catalyst cost, but reduces problems in removing the catalyst from the polymer at the end of the process.

The new catalysts also have the unexpected properties of being effective for polymerization of the substituted monomers containing oxygen, nitrogen, etc., as well as the unsaturated hydrocarbon monomers.

The metal salts to be used as carriers in the preparation of the new catalysts may be the salts of a great variety of different metals. Preferred metals include those having atomic weights between 24 and 209, such as, for example, magnesium, aluminum, silicon, phosphorus, calcium, titanium, chromium, manganese, iron, cobalt, nickel, zirconium, copper, cadmium, tin, antimony, cerium, beryllium, osmium, gold, silver, uranium, and the like. Particularly preferred metals are those of Groups II, III, VII, and VIII of the Mendelejeff Periodic Table of Elements. (Langes—Handbook of Chemistry, 3rd ed. p. 18.)

The negative portion of the metal salt may also vary. Preferably the negative radical is one free of oxygen, such as, for example, halogens as chlorine, bromine, iodine, and fluorine, sulfides, silicides, phosphines and the like.

Preferred salts are those which have a crystalline structure consisting of the metal atoms in a rhombohedral and each metal atom in the center of an octahedron of chloride atoms, such as, for example, cobaltous chloride, magnesium chloride, manganous chloride and cadmium dichloride.

Other examples of salts, include, among others, copper chloride, magnesium sulfide, magnesium fluoride, calcium sulfide, titanium trichloride, chronium trichloride, iron sulfide, iron chloride, nickel chloride, zinc chloride, cerium bromide, beryllium chloride, silver chloride, mercury chloride, uranium fluoride and the like, and mixtures thereof.

The size of these metal salt crystals must be rather small so as to provide the right amount of metal coated surface. The crystals preferably have a size between about 1 to 300 mesh, and still more preferably between 100 to 300 mesh. The crystal size should preferably be as uniform as possible.

The metal salts to be coated on the surface of the above-described metal salts may be any metal salt which is dissimilar from the crystals being coated. Examples of these salts include, among others, salts of titanium, zirconium, vanadium, aluminum, iron, zinc, tin, uranium, beryllium and the like and mixtures of salts may be employed.

Preferred salts to be employed include, among others, the halides, the sulfates, the nitrates, the sulfides, and chlorates of metals of Groups III, IV, V, and VIII of the Periodic Table of Elements and more preferably atomic volumes less than 20 and particularly between 15 and 5. Coming under special consideration, particularly because of the high activity of the polymerization catalyst prepared thereby, are titanium, vanadium and zirconium halides as the chlorides, iodides, bromides and fluorides.

The metal salts plated on the surface of the above-described crystals should only be in the form of a very thin layer. In this regard, the new catalysts are distinguished from catalysts obtained by merely mixing two salts together. Such prior mixtures are not effected in the polymerization of unsaturated compounds as the present catalyst compositions.

The metal salt layer in the present case varies from about 1 to 1000 molecules thick and should not be more than 2000 molecules thick. Best results are obtained when the salt layer is about 10 to 100 molecules thick.

The ratio of the amount of metal salt plated on the surface to the amount of metal salt being plated, i.e., the carrier, may vary depending upon the activity desired and the metal salts employed. Generally, the amount of metal salt to be plated will vary from 0.05 to 10 milligrams per gram of the metal salt carrier. Preferably, the amount of metal salt varies from .1 to 5 milligrams per gram of the metal salt carrier.

The new catalysts may be prepared by a variety of suitable methods. The preferred method for preparing the catalysts involves vacuum plating technique. Various methods for this are available and discussed in "Vacuum Deposition of Thin Films," L. Holland, 1st ed., 1956. A technique employs an apparatus made up as follows: a glass reaction flask (1) is joined through a T to a vacuum line with stopcock and through a line (containing stopcock) to another reaction flask (2). The metal salt to be plated is ground to a fine powder and placed in reaction flask (1). The metal salt which is to be applied to the surface of the other salt is dissolved in volatile solvent, such as heptane and placed in flask (2). The stopcock to flask (2) is closed and vacuum is applied to flask (1) with application of heat. This effects a cleaning of the surface of the metal salt particles so that there will be a better adhesion to the salt crystals. When the vacuum has been reduced to a certain level, say below $10^{-3}$ mm. and preferably below $10^{-5}$ mm., the vacuum stopcock is closed and the stopcock to flask (2) is opened and the vaporous solution containing dissimilar metal salt is drawn into the flask (1) and the metal salt coated on the surface of the crystals already in the flask. Liquid nitrogen can then be applied to flask (2) to remove the solvent.

It is also possible to prepare the new catalysts by preparing a solvent solution of the metal salt to be placed on the surface of the other, and then add this solution to the catalysts of the supporting salt and shake the mixture together. The solvent may then be evaporated leaving the plated catalyst.

After preparation, the new catalysts should preferably be kept from moisture and away from oxygen, such as in a moisture free container and in the presence of an inert gas such as nitrogen until the catalysts are to be utilized.

The new catalysts of the invention look substantially the same as the metal salts coated with the exception that they may, in some cases, have a slightly darker color. The catalyst cannot be separated into the original two salts as shown in Example I.

The new catalysts are effective for a variety of applications. They can be used, for example, as polymerization catalysts to form oriented or unoriented polymers from carbon-to-carbon unsaturated monomers as noted hereinafter.

The new catalysts of the invention also find use in many other types of reactions, such as in hydrogenation (e.g., benzene to cyclohexane) isomerization (e.g., isomerization N-hexene-1), alkylation (e.g., alkylation of benzene), chlorination, oxidation and the like, depending upon the type of metal salt and metal to be plated.

The catalysts of the invention are particularly outstanding as in combination with a metal alkyl cocatalyst. The metal alkyl used may be any of the known compounds having a hydrocarbon radical attached directly to metal, such as for example, alkyl derivatives of aluminum, tin, lithium, sodium, titanium, zinc, cadmium, zirconium and cobalt, such as aluminum triethyl aluminum triisobutyl, aluminum diethyl chloride, $Al_2Et_3Cl_3$ $AlEtCl_2$, aluminum triamyl, tin tetraethyl tin tetraphenyl, lithium butyl, sodium butyl, lithium phenyl, diethyl zinc, diethyl cadmium, aluminum triphenyl and the like, and mixtures thereof. Particularly preferred are the alkyl derivatives of Groups IV to VI of the Periodic Table of Elements, and preferably those wherein the alkyl groups contain no more than 6 carbon atoms each.

The special catalysts of the invention and the metal alkyls are combined so as to have the metal in the metal alkyl and the metal in the special salt, i.e., the metal from metal salt placed on the surface, in a weight ratio of .5 to 50. Preferably, these materials are combined in a weight ratio of 3 to 35.

The polymerization is accomplished by merely contacting the monomer to be polymerized with the new catalyst and the cocatalyst in an inert atmosphere and under substantially anhydrous conditions. The new catalyst and the metal alkyl may be added to the reaction mixture together, separately, or they may be premixed before being added to the reaction vessel. The monomer and catalyst may be brought into contact merely by mixing and stirring.

The amount of the new catalyst to be employed will vary depending upon the rate and conversion of polymer described. Thus, for example, if a slow rate and low conversion is desired, one should use a small amount of catalyst, and if one desires a fast rate and high conversion, larger amounts of catalyst should be employed. In general, the amount of the new catalyst employed will vary from about .5 to 5 parts by weight per 100 parts of the monomer to be polymerized. Preferred amounts of catalyst range from about .7 to 3 parts by weight per 100 parts of monomer.

The polymerization is preferably accomplished at low temperatures and pressures. Temperatures ranging from about 25° C. to about 110° C. or slightly higher are particularly preferred. Especially attractive temperatures range from about 40° C. to 80° C.

In using the catalysts of the invention, the polymerization appears to proceed slowly for say 1 to 2 hours and then increase in rate and proceeds rapidly then at temperatures say from 40 to 80° C. It may then be desirable to use higher temperatures at the beginning to reduce this type of induction period and then lower the temperature during the latter part of the reaction.

It may also be desirable, and this is particularly true for large scale commercial operations wherein a catalyst feed is being continuously introduced into the reaction to first pretreat the catalyst by saturating the catalyst solution with the monomer to be polymerized, such as, for example, propylene. The use of this pretreated catalyst solution tends to reduce the above-noted induction period.

Preferred pressures range from about atmospheric pressure up to about 1000 p.s.i. The exact pressure selected will generally depend on the rate selected as the rate is roughly proportional to the pressure, i.e., by doubling the pressure one may double the rate of polymerization. Very satisfactory rates are obtained by using pressures ranging from about 50 p.s.i.g. to 200 p.s.i.g.

The polymerization may be conducted in the presence or absence of solvents. Solvents are preferred as the catalysts display greater activity therein, it is usually easier to remove the product from the reaction vessel and they assist in removal of heat of reaction. Preferred solvents are the inert hydrocarbons, such as octane, isooctane, n-heptane, xylene, benzene and the like. The solvent is usually employed so as to form rather dilute solutions, i.e., 10 to 30% solutions of the monomer.

Additives may also be employed in the reaction to increase rate of polymerization, control molecular weight and increase insoluble content. Examples of materials include, among others, hydrogen, oxygen, acetylene, Lewis bases as pyridine, esters as ethyl acetate, tributyl phosphite, phenols, and the like. Amounts of such materials may vary from as little as .001 to as high as 50% by weight of the monomer being polymerized.

Other metal salts, such as titanium halides and the like may also be included.

As noted above, the polymerization process is conducted in an inert atmosphere. This is preferably accomplished by sweeping out the reaction zone with an inert gas and maintaining an atmosphere of inert gas during the course of the reaction. Suitable inert materials include nitrogen, methane and the like.

The process should also be conducted under substantially anhydrous conditions. This is accomplished by using anhydrous reactants and dry reaction vessels and maintaining customary precautions during the reaction to keep water out of the reaction vessel.

After the completion of the polymerization reaction, the catalyst and solvent are removed from the polymer. This is preferably accomplished by adding an acidified alcoholic solution to the reaction mixture. This causes precipitation of the polymer and the catalyst (which enters reaction with the alcohol) is removed in the alcoholic fraction.

The products formed by the above-described process will be relatively high molecular weight solid polymers. The products may be used in making fibers, films and various molded articles. The products will preferably have molecular weights ranging from about 50,000 to 1,000,000 as determined by the light scattering technique, and will have melting points preferably ranging from about 90 to 330° C. The polymers prepared from monomers such as propylene, butene and styrene have an isotactic structure as evidenced by insolubility in appropriate solvents, as n-heptane.

The process of the invention may be used to polymerize unsaturated monomers such as ethylene and those capable of forming stereospecific polymers, such as alpha-olefins as propylene, isobutylene, isoamylene, hexylene, decene, dodecene, octadecene, diolefins, e.g., butadiene, isoprene, methyl pentadiene, dimethyl butadiene, piperylene, and the like, and mixtures thereof. The process may also be used to polymerize the vinyl type monomer, such as unsaturated esters as methyl acrylate, butyl acrylate, propylacrylate and methyl methacrylate; the vinylidene halides, such as vinyl chloride and vinylidene bromide; unsaturated nitriles, such as acrylonitrile and methacrylonitrile; vinyl esters of monocarboxylic acids, such as vinyl acetate, and vinyl butyrate; unsaturated esters of polycarboxylic acids, such as divinyl succinate, divinyl adipate, divinyl phthalate, diallyl phthalate, vinyl allyl pimelate; the unsaturated esters of unsaturated monocarboxylic acids, such as vinyl acrylate, allyl acrylate, vinyl crotonate, vinyl methacrylate and the like; unsaturated ethers, such as diallyl ether, allyl butyl ether, vinyl allyl ether; and the vinyl ketones, such as vinyl butyl ketone and vinyl ethyl ketone. This group also includes the polyunsaturated compounds such as obtained by esterifying a glycerol of trihydric alcohol, such as ethylene glycol, glycerine, hexanetriol and the like, with an unsaturated acid, as acrylic acid or methacrylic acid, as well as the polyunsaturated esters obtained by etherifying polyhydric alcohols with unsaturated alcohols, such as triallyl ether of glycerol, triallyl ether of hexanetriol and the like.

Preferred monomers to be employed include the alpha-monoolefins, such as those containing up to 8 carbon atoms, styrenes and alkyl acrylates and alkyl methacrylates wherein the alkyl contains up to 8 carbon atoms.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the preparation of a catalyst by plating cobaltous chloride coated with a thin layer of titanium tetrachloride, and the use of this catalyst for polymerizing alpha-olefins.

100 parts of cobaltous chloride crystals having a size of about 100 mesh were placed in a reaction vessel similar to that described above. The reaction vessel was heated to 400° C. and evacuated to a pressure of about $10^{-5}$ mm. After about 30 minutes, the stopcock was opened and the heptane vapors containing the titanium tetrachloride came over into the reaction zone and the titanium tetrachloride particles coated the surface of the cobaltous chloride crystals. Liquid nitrogen was then applied to remove the heptane solvent. The coated crystals were then removed and placed in a moisture free container. The crystals appeared to have a slightly grayer color than before the treatment and analysis indicated that the crystals contained about .5 milligram of titanium per gram of cobaltous chloride.

1 part of the catalyst prepared as above was then introduced into a reaction vessel containing 100 parts by weight of anhydrous heptane and .2 part by weight of aluminum triethyl. This was done under nitrogen and in the absence of moisture. Anhydrous propylene was then introduced into this mixture with a pressure of about 120 p.s.i.g. (introduction of about 25 parts of monomeric propylene). The mixture was then agitated by tumbling at a temperature of 50–70° C. for several hours. The resulting mixture was then poured into isopropanol to precipitate the polymer. The resulting polymer was a white crystalline product having a high degree of crystallinity. The yield was 90%. The polymer could be molded by conventional means to form a solid flexible molding.

Other catalysts were prepared in the same manner as described above and used to polymerize propylene. The results are shown in the table below:

| Ex. No. | CoCl$_2$¹ TiCl$_4$, grams | Heptane, grams | Et$_3$Al, mm. | Propylene, grams | Conversion | I.V. |
|---|---|---|---|---|---|---|
| 1 | 4.054 | 100 | 0.5 | 17.7 | 96 | 3.0 |
| 2 | 3.233 | 100 | 1.0 | 18.0 | 97 | 3.2 |

¹ 0.05 mm. of TiCl$_4$ to 1 gram of CoCl$_2$.

In another experiment, the polymerization was repeated using only TiCl$_4$ as the catalyst with the Et$_3$Al. The results are shown below:

| Heptane, grams | TiCl$_4$, mm. | Et$_3$Al, mm. | Propylene, grams | Conversion, percent |
|---|---|---|---|---|
| 100 | 0.015 | 1.0 | 16.3 | <0.5 |

*Example II*

(A) 100 parts of cobaltous chloride crystals having the size of about 100 mesh were placed in a reaction vessel and a solvent solution of titanium tetrachloride introduced therein and the mixture shaken. This solution, which contains as maximum .05 mm. of TiCl$_4$ per 1 gram of CoCl$_2$, was used directly in the polymerization. Evaporation of the solution would give crystals of the desired catalyst.

A series of other catalysts were prepared in the same manner and used to polymerize propylene as shown in Example I. The results are shown in the following table:

| Ex. No. | CoCl₂, g. | TiCl₄, milli-moles | Et₃Al, milli-moles | Propyl-ene, g. | Conversion, g. | I.V. |
|---|---|---|---|---|---|---|
| 1 | 2.573 | 0.018 | 0.5 | 20.4 | 90 | 3.0 |
| 2 | 2.681 | 0.018 | 1.0 | 17.5 | 90 | 3.4 |
| 3 | 2.829 | 0.081 | 1.0 | 16.7 | 97 | 3.5 |
| 4 | 2.555 | 0.009 | 1.0 | 18.4 | 63 | 3.6 |
| 5 | 3.049 | 0.015 | 1.0 | 17.1 | 91 | 3.4 |
| 6 | 2.977 | 0.015 | 1.0 | 15.2 | 91 | 3.7 |
| 7 | 2.722 | 0.015 | 1.0 | 17.1 | 97 | 3.6 |
| 8 | 2.941 | 0.100 | 0.35 | 16.9 | 85 | 3.0 |
| 9 | 0.506 | 0.015 | 1.0 | 16.3 | 88 | 3.4 |
| 10 | 1.131 | 0.015 | 1.0 | 16.8 | 76 | 4.0 |

(B) To show the difference in results obtained over the use of the same amount of titanium tetrachloride without being plated on the salts, similar polymerization runs were made with the exception that the catalyst was only the straight titanium tetrachloride with the aluminum triethyl. The results are shown in the following table:

| Ex. No. | CoCl₂ | TiCl₄, mm. | Et₃Al, mm. | Propyl-ene, g. | Conversion | I.V. |
|---|---|---|---|---|---|---|
| 5 | | 0.018 | 0.5 | 20.2 | <0.5 | |
| 6 | | 0.018 | 1.0 | 17.9 | <0.5 | |
| 7 | | 0.009 | 1.0 | 17.7 | <0.5 | |
| 8 | | 0.18 | 1.0 | 18.6 | 8 | |

(C) Related experiments using only the cobaltous chloride in the amounts shown in the table of part (A) as the only catalyst with the aluminum triethyl were also run. In these cases also there was very poor conversion of polymer obtained.

*Example III*

This example illustrates the preparation of a catalyst by plating magnesium dichloride with titanium tetrachloride, and the use of this catalyst for polymerizing propylene.

100 parts of magnesium dichloride crystals having the size of about 100 mesh were placed in a reaction vessel and a solvent solution of titanium tetrachloride introduced therein and the mixture shaken. The solvent was then evaporated. The crystals that were obtained appeared to be the same as the magnesium dichloride with a slightly darker color. Analysis indicated that the crystals contained about .5 milligram of titanium per gram of magnesium dichloride salt.

The above catalyst was introduced into a reaction vessel containing 100 parts of anhydrous heptane and aluminum triethyl. This was done under nitrogen and in the absence of moisture. Anhydrous propylene was then introduced into this mixture with a pressure of about 120 p.s.i.g. (19.5 parts of propylene). The mixture was then agitated by tumbling at 50° C. for 24 hours. The resulting mixture was then poured into isopropanol to precipitate the polymer. The resulting polymer was a white solid high molecular weight polymer which could be molded to form a flexible molding.

Other catalysts were prepared in the same manner and used to polymerize propylene as in Example I. The results are shown in the table below:

| Ex. No. | MgCl₂, g. | TiCl₄, mm. | Et₃Al, mm. | Propyl-ene | Conversion | I.V. |
|---|---|---|---|---|---|---|
| 1 | 2.307 | 0.015 | 1.0 | 16.7 | 94 | 1.4 |
| | 2.527 | 0.015 | 0.5 | 18.7 | 94 | 2.1 |

The above polymerization was repeated using only titanium tetrachloride. At the end of 24 hours there was less than 0.5% conversion.

In a further experiment the magnesium dichloride was used alone and no polypropylene was obtained.

*Example IV*

This example illustrates the preparation of a catalyst composition comprising cobaltous chloride coated with a thin layer of titanium trichloride and the use of this catalyst in the preparation of polypropylene.

100 parts of cobaltous chloride crystals having a size of about 100 mesh were placed in a reaction vessel and mixed with a solution of methyl titanium trihalide, and the mixture kept at −50° C. The temperature was allowed to rise at which time the methyl titanium trihalide decomposed forming a thin layer of titanium trihalide on the cobaltous trichloride.

1 part of the catalyst as prepared above was then introduced into the reaction vessel containing 100 parts of anhydrous heptane and .2 part of aluminum triethyl. This was done under nitrogen and in the absence of moisture. Anhydrous propylene was then introduced into this mixture with the pressure at about 120 p.s.i.g. The mixture was then agitated by tumbling at a temperature of 50° C. for about 20 hours. The resulting mixture was then poured into isopropanol to precipitate the polymer. The resulting polymer was a white solid polymer which could be molded to form a flexible molding.

Related results are obtained by replacing the cobaltous chloride with cobaltous bromide and with magnesium chloride.

*Example V*

1 part of the CoCl₂–TiCl₄ catalyst prepared in Example I was introduced into a reaction vessel containing 100 parts by weight of anhydrous heptane and .2 part by weight of aluminum triethyl. This was done under nitrogen and in the absence of moisture. Anhydrous ethylene was then introduced into this mixture with a pressure of about 120 p.s.i.g. This mixture was then agitated by tumbling at a temperature of 50–70° C. for several hours. The resulting mixture was then poured into isopropanol to precipitate the polymer. The resulting product was a white solid high molecular weight polyethylene. The polymer was obtained in 95% yield.

The above process was repeated with the exception that the triethyl aluminum was replaced by diethyl aluminum chloride. Related results were obtained.

*Example VI*

The Examples I, II and V were repeated with the exception that pyridine in concentrations varying from 0.003 millimole to 0.150 millimole (per .015 mm. of supported Ti halide) was introduced into the reaction mixture. In this case, yields of solid polymer obtained varied from 95% to 97%.

*Example VII*

Examples I, II and V were repeated with the exception that ethyl acetate in concentrations varying from 0.003 millimole to 0.150 millimole (per .015 mm. of supported Ti halide) was introduced into the reaction mixture. In this case, the yield of solid polymer was about 75% and the insoluble was about 71%.

*Example VIII*

0.5 part of the catalyst prepared as in Example IV made up of 0.02 millimole of the TiCl₃ on 0.576 part of cobaltous chloride was added to 100 parts of heptane and 1.0 millimole of aluminum triethyl. Anhydrous propylene was then introduced into this mixture with a pressure of about 120 p.s.i. (introduction of about 13.0 parts of monomeric propylene). This mixture maintained at 50° C. for several hours. The resulting product was a high molecular weight white solid polymer having an I.V. of 3.6. The polymer was obtained in 74% yield.

*Example IX*

The preceding example was repeated with the exception that the proportions of the cobaltous chloride and titanium halide were varied and in some cases pyridine was added. The results are shown in the following table:

| Ex. No. | CoCl₂, grams | TiCl₃, millimole | Additive, millimole | Cocatalyst, millimole | Propylene | Yield Solid Polymer, percent | I.V. |
|---|---|---|---|---|---|---|---|
| 1 | 0.600 | 0.02 | | 1.0 Et₃Al | 17.4 | 73 | 3.5 |
| 2 | 0.544 | 0.02 | | 0.5 Et₃Al | 17.0 | 95 | 3.4 |
| 3 | 1.848 | 0.02 | | 1.0 Et₃AlCl | 17.0 | 99.5 | 2.6 |
| 4 | 1.682 | 0.02 | 0.3 pyridine | 1.0 Et₃Cl | 16.1 | 92 | 3.6 |
| 5 | | 0.02 | | 1.0 Et₃Al | 17.0 | Trace | |

*Example X*

This example illustrates the preparation of a catalyst by plating magnesium dichloride with beta-TiCl₃ (brown catalyst from decomposition of MeTiCl₃), and the use of this catalyst for the polymerization of propylene.

The catalyst was prepared as follows: 100 parts of magnesium chloride crystals having a size of about 100 mesh were placed in a reaction vessel and mixed with a solution of methyl titanium trihalide, and the mixture kept at —50° C. The temperature was allowed to rise at which time the methyl titanium trihalide decomposed forming a layer of titanium trihalide on the magnesium halide.

1.5 parts of the above catalyst made up of 0.02 millimole of TiCl₃ and 0.959 gram of magnesium dichloride was added to 100 parts of heptane and 1.0 millimole of diethyl aluminum chloride. Anhydrous propylene was then introduced into this mixture with a pressure of about 120 p.s.i.g. to introduce 17.0 grams of propylene. This mixture was maintained at 50° C. for several hours. The resulting product was a high molecular weight white solid polymer having an I.V. of 2.6.

*Example XI*

Example I was repeated with the exception that the source of CoCl₂ was cobaltous chloride supported on calcium sulfate. Using a catalyst made up of 0.4 to 0.5 g./0.015 millimole TiCl₄, a high molecular weight solid polymer of propylene was obtained in 70% yield.

*Example XII*

Example I was repeated with the exception that the CoCl₂-TiCl₄ catalyst was employed with diethyl aluminum chloride as cocatalyst. In this case, a polymer having an I.V. of 2.5 was obtained in 96% yield. 80–90% of the polymer was high mol wt. amorphous. This demonstrates that the process of the invention can be used to prepare polymers having varying degrees of crystallinity and amorphous structure.

*Example XIII*

This example illustrates the preparation of a catalyst by plating cobaltous bromide with titanium tetrachloride, and using this for the polymerization of propylene.

100 parts of cobaltous bromide crystals having size of about 100 mesh were placed in a reaction vessel similar to that described in Example I. The reaction vessel was heated to 400° C. and exacuated to a pressure of about 10⁻⁵ mm. After about 30 minutes, the stopcock was opened and the heptane vapors containing the titanium tetrachloride came into the reaction zone and the titanium tetrachloride particles plated the surface of the cobaltous bromide crystals. Liquid nitrogen was applied to remove the heptane solvent. The coated crystals were then removed and placed in a moisture free container. The crystals appeared to have a slightly grayer color than before the treatment and analysis indicated that the crystals contained about .5 milligram of titanium per gram of cobaltous bromide salt.

The above-described catalyst was employed with tri- ethyl aluminum and diethyl aluminum chloride to polymerize propylene with the following results:

| CoBr₂, g. | TiCl₄, millimoles | Activator, millimoles | Ethyl Acetate, millimoles | I.V. |
|---|---|---|---|---|
| 3.2 | 0.015 | 1.0 Et₃Al | | 2.9 |
| 1.0 | 0.015 | 1.0 Et₃Al | | 2.8 |
| 0.6 | 0.015 | 1.0 Et₃Al | | 3.0 |
| 0.5 | 0.015 | 1.0 Et₃Al | 0.015 | 3.2 |
| 0.5 | 0.015 | 1.0 Et₃Al | 0.150 | 3.8 |
| 0.5 | 0.015 | 0.5 Et₃AlCl | | 3.4 |

*Example XIV*

This example illustrates the preparation of a catalyst by plating ferrous chloride with titanium tetrachloride, and using this for the polymerization of propylene.

100 parts of ferrous chloride crystals having size of about 100 mesh were placed in a reaction vessel similar to that described in Example I. The reaction vessel was heated to 400° C. and evacuated to a pressure of about 10⁻⁵ mm. After about 30 minutes, the stopcock was opened and heptane vapors containing the titanium tetrachloride came into the reaction zone and the titanium tetrachloride particles plated the surface of the ferrous chloride crystals. Liquid nitrogen was applied to remove the heptane solvent. The coated crystals were then removed and placed in a moisture free container. The crystals appeared as before the reaction and analysis indicated that the crystals contained about .5 milligram of titanium per gram of ferrous chloride salt.

The above catalyst was employed with triethyl aluminum and diethyl aluminum chloride to polymerize propylene as in Example I with the following results:

| Ex. No. | FeCl₂, g. | TiCl₄, millimoles | Activator, millimoles | Yield Solid Polymer | I.V. (150°, Decalin) |
|---|---|---|---|---|---|
| 1 | 3.0 | 0.015 | 1 Et₃Al | 97 | 2.8 |
| 2 | 1.0 | 0.015 | 1 Et₃Al | 94 | 3.1 |
| 3 | 0.7 | 0.015 | 1 Et₃Al | 71 | 3.2 |
| 4 | 3.0 | 0.015 | 1 Et₂AlCl | 92 | 2.9 |

*Example XV*

This example illustrates the preparation of a catalyst by plating cobaltous chloride with vanadium tetrachloride, and the use of this for the polymerization of propylene.

100 parts of cobaltous chloride crystals having size of about 100 mesh were placed in a reaction vessel similar to that described in Example I. The reaction vessel was heated to 400° C. and evacuated to a pressure of about 10⁻⁵ mm. After about 30 minutes, the stopcock was opened and heptane vapors containing vanadium tetrachloride came into the reaction zone and the vanadium tetrachloride particles plated the surface of the cobaltous chloride crystals. Liquid nitrogen was applied to remove the heptane solvent. The coated crystals were then removed and placed in a moisture free container. The crystals appeared as before the treatment and analysis indicated they contained about .5 milligram per gram of cobaltous chloride.

The above described catalyst was employed with triethyl aluminum and diethyl aluminum chloride to polymerize propylene under the conditions noted in Example I. The resulting product was a white solid polymer having an I.V. of 6.6

*Example XVI*

The preceding example was repeated with the exception that the vanadium tetrachloride was replaced with vanadyl chloride ($VOCl_3$). Similar results are obtained.

*Example XVII*

Example I is repeated with the exception that the cobaltous chloride is replaced with cerium chloride. Similar results are obtained.

*Example XVIII*

Examples I, II and VI are repeated with the exception that the monomer polymerized is styrene. Related results are obtained.

*Example XIX*

Example I was repeated with the exception that the cobaltous chloride was placed on sodium chloride, naphthalenes and anthracene and the catalyst used to polymerize propylene. No polymer was obtained.

The I.V. values in the above examples were determined at 150° C. in decalin.

The claimed invention is:

1. A new catalyst consisting of small crystals of an inorganic metal salt of a metal having an atomic weight between 24 and 209 and selected from Groups II, III, IV, V, VII and VIII of the Periodic Table of Elements, the anion portion of said salts being free of oxygen, coated on the surface with a thin layer of from 1 to 2000 molecules thick of a dissimilar metal salt of the group consisting of halides, sulfates, nitrates, sulfides and chlorates of a heavy metal having an atomic volume less than 20.

2. A new catalyst consisting of small crystals of a cobalt halide coated on the surface with a thin layer of from 1 to 2000 molecules thick of a dissimilar metal salt of the group consisting of halides, sulfates, nitrates, sulfides and chlorates of a heavy metal having an atomic volume less than 20.

3. A new catalyst consisting of small crystals of an inorganic metal salt of a metal having an atomic weight between 24 and 209 and selected from Groups II, III, IV, V, VII and VIII of the Periodic Table of Elements, the anion portion of said salts being free of oxygen, coated on the surface with a thin layer of from 1 to 2000 molecules thick of titanium chloride.

4. A catalyst composition consisting of crystals of an inorganic cobalt salt, the anion portion of which is free of oxygen, coated on the surface with a molecularly thin layer of a titanium halide, said layer being from 1 to 2000 molecules thick.

5. A catalyst composition consisting of crystals of cobaltous chloride coated on the surface with a thin layer of a titanium halide, said layer being from 1 to 2000 molecules thick.

6. A catalyst composition consisting of crystals of magnesium dichloride coated on the surface with a thin layer of a titanium chloride, said layer being from 1 to 2000 molecules thick.

7. A catalyst composition consisting of crystals of cobaltous bromide coated on the surface with a thin layer of a titanium halide, said layer being from 1 to 2000 molecules thick.

8. A catalyst composition consisting of crystals of magnesium chloride coated on the surface with a thin layer of vanadium halide, said layer being from 1 to 2000 molecules thick.

9. A catalyst as in claim 1 wherein the layer of metal salt is from 1 to 1000 molecules thick.

References Cited by the Examiner

UNITED STATES PATENTS

| | | | |
|---|---|---|---|
| 1,900,882 | 3/1933 | Lusby | 252—462 |
| 2,525,073 | 10/1950 | Kimberlin | 252—462 |
| 2,920,065 | 1/1960 | Myerholtz et al. | |
| 2,921,032 | 1/1960 | Linn | 252—429 X |
| 2,930,767 | 3/1960 | Novak | 252—477 |
| 2,931,792 | 4/1960 | Aries. | |

MAURICE A. BRINDISI, *Primary Examiner.*

MORRIS LIEBMAN, JULIUS GREENWALD,
*Examiners.*